(12) United States Patent
Zhang

(10) Patent No.: US 9,828,969 B2
(45) Date of Patent: Nov. 28, 2017

(54) WIND TURBINE ROTATING BLADE

(71) Applicant: JIANGSU NEWHOPE RENEWABLE ENERGY S&T CO., LTD, Changzhou (CN)

(72) Inventor: Dapeng Zhang, Changzhou (CN)

(73) Assignee: JIANGSU NEWHOPE RENEWABLE ENERGY S & T CO., LTD, Changzhou (CN)

( * ) Notice: Subject to any disclaimer, the term of this patent is extended or adjusted under 35 U.S.C. 154(b) by 272 days.

(21) Appl. No.: 14/771,955

(22) PCT Filed: May 9, 2013

(86) PCT No.: PCT/CN2013/075379
§ 371 (c)(1),
(2) Date: Dec. 2, 2015

(87) PCT Pub. No.: WO2014/131246
PCT Pub. Date: Sep. 4, 2014

(65) Prior Publication Data
US 2016/0160838 A1   Jun. 9, 2016

(30) Foreign Application Priority Data
Mar. 1, 2013   (CN) .......................... 2013 1 0064698

(51) Int. Cl.
*F03D 11/00* (2006.01)
*F03D 3/06* (2006.01)
(Continued)

(52) U.S. Cl.
CPC ............. *F03D 3/064* (2013.01); *F03D 3/005* (2013.01); *F03D 3/062* (2013.01); *F03D 3/065* (2013.01);
(Continued)

(58) Field of Classification Search
CPC .......... F03D 3/064; F03D 3/005; F03D 3/062; F03D 3/065; F03D 3/06; F03D 3/061;
(Continued)

(56) References Cited

FOREIGN PATENT DOCUMENTS

| AU | 2006183 A | 4/1984 |
| CN | 2497075 Y | 6/2002 |

(Continued)

OTHER PUBLICATIONS

The World Intellectual Property Organization (WIPO) International Search Report for PCT/CN2013/075379 dated Nov. 28, 2013.

*Primary Examiner* — Jason Shanske
*Assistant Examiner* — Kelsey Stanek
(74) *Attorney, Agent, or Firm* — Anova Law Group, PLLC

(57) ABSTRACT

The present invention provides a wind turbine having rotating blades, comprising: a base, a rotation shaft, turbine blades, blade ferrules, an upper flange, a generator and a lower flange. The rotation shaft is arranged on the base. The blade ferrules are installed on the rotation shaft. Blade ferrules are applied to fixate between the rotation shaft and the turbine blades. The rotation shaft is connected to the generator. The upper flange is arranged above the generator and the lower flange is arranged under the generator. The disclosed wind turbine may increase utilization efficiency of wind power and is highly advantageous to startup the generator under breeze condition.

10 Claims, 1 Drawing Sheet

(51) Int. Cl.
*F03D 3/00* (2006.01)
*F03D 9/25* (2016.01)
(52) U.S. Cl.
CPC .......... *F03D 9/25* (2016.05); *F05B 2230/604* (2013.01); *F05B 2240/213* (2013.01); *F05B 2260/30* (2013.01); *Y02E 10/74* (2013.01); *Y02P 70/523* (2015.11)
(58) Field of Classification Search
CPC ...... F03D 9/25; F03D 9/002; F05B 2230/604; F05B 2240/213; F05B 2260/30; Y02E 10/74; Y02P 70/523
USPC ......... 415/79, 4.2, 4.4, 907, 905; 416/204 R, 416/223 R, 119, 120, 120 R, 211; 290/55, 44
See application file for complete search history.

(56) References Cited

FOREIGN PATENT DOCUMENTS

| | | |
|---|---|---|
| CN | 201339541 Y | 11/2009 |
| CN | 102141009 A | 8/2011 |
| CN | 202047934 U | 11/2011 |
| CN | 202181985 U | 4/2012 |
| KR | 20120110810 A | 10/2012 |

WIND TURBINE ROTATING BLADE

CROSS-REFERENCES TO RELATED APPLICATIONS

This application is a national phase entry under 35 U.S.C. §371 of International Application No. PCT/CN2013/075379, filed on May 9, 2013, which claims priority to and benefits of Chinese Patent Application Serial No. 201310064698.9, filed with the State Intellectual Property Office of P. R. C. on Mar. 1, 2013, the entire contents of which are incorporated herein by reference

FIELD OF THE DISCLOSURE

The present disclosure relates to the field of wind turbine technologies and, more particularly, relates to rotating blades for wind turbines.

BACKGROUND

With growing energy consumption, new types of clean energies have been widely explored. In plains with large open areas, wind power has been widely used. In existing wind turbines, rotating spiral blades may drive the generator to rotate and generate electricity. These generators have low efficiency and low generating capacity under breeze condition. Further, in ordinary blade joints and blade supporting and blade ferrule structures, the blade supporting strut often use round and square materials, and does not meet the aerodynamic requirements. When connected with the blades, the blade supporting strut cannot effectively comply with three-dimensional helical surface of the blades. In addition, these components have complex manufacturing process, low efficiency and high cost.

BRIEF SUMMARY OF THE DISCLOSURE

Technical Problem

To overcome disadvantages of existing wind turbine which have low efficiencies under breeze condition, the present disclosure provides a wind turbine rotating blade.

Technical Solution

The present disclosure provides a wind turbine having rotating blade, including a base, a rotation shaft, turbine blades, blade ferrules, an upper flange, a generator and a lower flange. The rotation shaft is arranged on the base. The blade ferrules are installed on the rotation shaft. The turbine blades are installed on the blade ferrules. The rotation shaft is connected to the generator. The upper flange is arranged above the generator and the lower flange is arranged under the generator. A blade ferrule includes an upper blade ferrule and a lower blade ferrule. The blade ferrule is configured to have positioning holes. Connection positioning blocks are arranged at the junction between the upper blade ferrule and the lower blade ferrule. Turbine blade struts are installed at the lateral side of the upper blade ferrule and at the lateral side of the lower blade ferrule. The number of blade ferrules is at least four. The blade ferrules are installed on the rotation shaft in a spiral manner at equally divided locations. The vertical distances between two neighboring blade ferrules are the same. The upper blade ferrule and the lower blade ferrule are fixated at their junction by a bolt through the positioning holes. The connection positioning blocks are used to fixate the positions of the upper blade ferrule and the lower blade ferrule during the process of holding the upper blade ferrule and the lower blade ferrule together. The turbine blades are made of basalt. The turbine blades are fixed on blade contact surfaces in a twisted and rotated manner. The blade contact surfaces are arranged at the left end of the upper blade ferrule, the right end of the lower blade ferrule and the outer ends of the turbine blade struts. The turbine blade strut is configured to have a protrusion. The horizontal surface of the protrusion is perpendicular to the turbine blades. The cross section of the turbine blade strut has an airfoil shape. The blade contact surfaces have an arc shape.

Advantageous Effects

In the disclosed wind turbine having rotating blades, turbine blades for traditional wind turbines may be twisted in a helical shape. This may enhance wind power utilization efficiency of the wind turbine. When the wind turbine is in operation, concaving part of a turbine blade may catch wind flow and rotate in the wind stream, bulging part of the turbine blade may prevent rotation. When implementing the disclosed twisting pattern, the upper part of one turbine blade and the lower part of the other turbine blade may always be in a position to catch the wind. Thus, the wind turbine may obtain driving power regardless how the wind direction changes, and may be particularly useful to start the wind turbine when there is a small wind. The blade ferrule structure may adopt advanced three-dimensional design, and may be modified and improved according to aerodynamic performance analysis. The blade ferrule structure may be manufactured by putting (Chinese national standard 102 type) aluminum alloy through a die casting process using a die casting mould. The cross section of the turbine blade struts may assume an airfoil shape. Blade contacting surface of the turbine blade struts may have desired compatibility with the turbine blades. Thus, this may solve the problem of connecting ordinary turbine blades and the problem of configuring a proper structure of supporting blade ferrules. The turbine blade may be manufactured as a whole by basalt, and may be twisted and fixated on the blade ferrules. This may facilitate transportation, and the turbine blades may not be damaged during shipment.

BRIEF DESCRIPTION OF THE DRAWINGS

Drawings and embodiments are combined to further describe the present disclosure.

Figure 1:
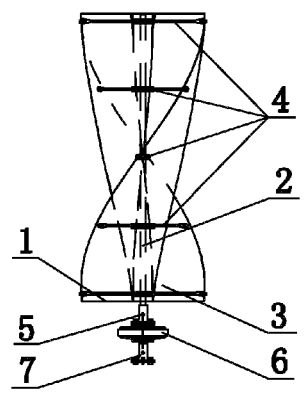
FIG. 1 illustrates a schematic structure according to the present disclosure.
Figure 2:
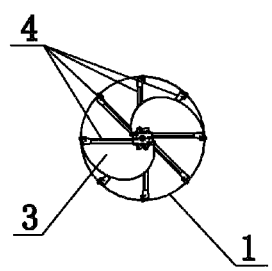
FIG. 2 illustrates a top view according to the present disclosure.

Reference numbers in the figures: base 1, rotation shaft 2, turbine blade 3, blade ferrule 4, upper flange 5, generator 6, lower flange 7, turbine blade strut 8, blade contact surface 9, connection positioning block 10, protrusion 11, positioning hole 12, upper blade ferrule 13, and lower blade ferrule 14.

DETAILED DESCRIPTION

Figure 3:
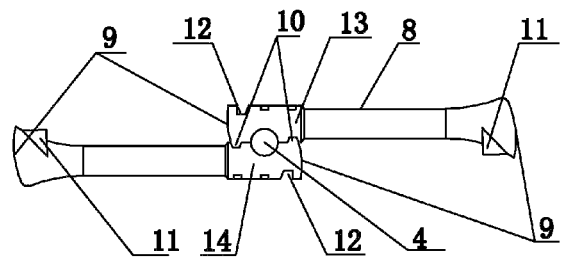
FIG. 3 illustrates an exemplary blade ferrule structure consistent with the disclosed embodiments.
Figure 4:
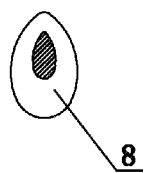
FIG. 4 illustrates a cross-sectional view of an exemplary turbine blade strut consistent with the disclosed embodiments.

FIG. 1 illustrates a schematic structure according to the present disclosure. As shown in FIG. 1, a wind turbine having rotating blades may include a base 1, a rotation shaft 2, turbine blades 3, blade ferrules 4, an upper flange 5, a generator 6, and a lower flange 7. The rotation shaft 2 is arranged on the base 1. The blade ferrules 4 are installed on the rotation shaft 2. The turbine blades 3 are installed on the blade ferrules 4. The rotation shaft 2 is connected to the generator 6. The upper flange 5 is arranged above the generator 6 and the lower flange 7 is arranged under the generator 6. As shown in FIG. 3, a blade ferrule 4 may include an upper blade ferrule 13 and a lower blade ferrule 14. Positioning holes 12 may be arranged on the blade ferrules 4. Connection positioning blocks 10 may be arranged at the junction of the upper blade ferrule 13 and the lower blade ferrule 14.

As shown in FIGS. 1-4, in the disclosed wind turbine having rotating blades, the turbine blades 3 may be twisted in a helical shape, which may enhance wind power utilization efficiency of the wind turbine. When the wind turbine is in operation, concaving part of a turbine blade may catch wind flow and rotate in the wind stream, bulging part of the turbine blade may prevent rotation. When implementing the disclosed twisting pattern, the upper part of one turbine blade and the lower part of another turbine blade may always be in a position to catch the wind. Thus, the wind turbine may obtain driving power regardless how the wind direction changes. The turbine blades 3 and the rotation shaft 2 may be connected using the blade ferrules 4, which may enhance stabilities of the turbine blades 3. The upper flange 5 may connect the rotation shaft 2 to the generator 6. The lower flange 6 may anchor the generator 6 on a frame or on the ground. The installation is fast and convenient, and may have a desired use effect.

The blade ferrule 4 may connect to turbine blade struts 8, whose cross section may have an airfoil shape. Blade contact surfaces 9 on the blade ferrule 4 and the turbine blade struts 8 may have a desired compatibility with the turbine blades 3. These may solve the problem of connecting ordinary turbine blades and the problem of configuring a proper structure of supporting blade ferrules 4. The blade contact surfaces 9 may have an arc shape, which may fit well with the turbine blades 3 and improves fixation results. A set of connection positioning blocks 10 may have compatible protruding and recessing trapezoidal shapes, thus assembling the blade ferrules may be quick and convenient, which enhances installation efficiency.

In the disclosed wind turbine having rotating blades, the turbine blade struts 8 may be installed on the lateral side of the upper blade ferrule 13 and the lateral side of the lower blade ferrule 14.

The disclosed wind turbine may have at least four blade ferrules 4. The blade ferrules 4 may be mounted on the rotation shaft 2 in a spiral fashion at equally divided locations. The vertical distances between two neighboring blade ferrules may be consistent.

Multiple blade ferrules 4 may enhance stability of the turbine blades 3. The blade ferrules 4 may be mounted at equally divided locations on the rotation shaft 2, which may comprehensively support the turbine blades 3, ensure the turbine blades 3 to be completely mounted on the blade ferrules 4 and allow the turbine blades 3 to have smooth surface. Therefore, the wind utilization efficiency may be improved and desired usage results may be achieved.

In the disclosed wind turbine having rotating blades, blade contact surfaces 9 may be arranged at the left end of the upper blade ferrule 13, the right end of the lower blade ferrule 14 and the outer ends of the turbine blade struts 8. The turbine blades 3 may be made of basalt. The turbine blades 3 may be fixated on the blade contact surfaces 9 in a twisted and rotated, i.e., spiral or helical, manner.

In the disclosed wind turbine having rotating blades, the upper blade ferrule 13 and the lower blade ferrule 14 may be fixated at the junction by a bolt going through the positioning holes 12. The connection positioning blocks 10 may be used for positioning when putting the upper blade ferrule and the lower blade ferrule together.

During installation process, the connection positioning blocks 10 may indicate positions of the upper blade ferrule and the lower blade ferrule, which enhances installation accuracy. Further, the upper blade ferrule and the lower blade ferrule may be secured tightly by putting a bolt through the positioning holes 12, which may have desired use effect.

In the disclosed wind turbine having rotating blades, the turbine blade strut 8 may be configured to have a protrusion 11. The horizontal surface of the protrusion 11 may be perpendicular to a turbine blade 3.

The horizontal surface of the protrusion 11 and the turbine blade 3 are perpendicular, the turbine blade 3 may thus have a desired contact with the blade contact surface 9, which may enhance fixation results.

In the disclosed wind turbine having rotating blades, the blade contact surface 9 may have an arc-shaped surface.

The arc-shaped surface of the blade contact surface 9 may fit well with the turbine blade 3, and ensure the roundness of the turbine blade 3.

In the disclosed wind turbine having rotating blades, the cross section of the turbine blade strut 8 may have an airfoil shape.

The airfoil shaped turbine blade strut 8 may have desired aerodynamic characteristics, reduce resistance and enhance the efficiency of power generation.

What is claimed is:

1. A wind turbine having rotating blades, comprising:
    a base,
    a rotation shaft,
    a plurality of turbine blades,
    a plurality of blade ferrules, each blade ferrule including an upper blade ferrule and a lower blade ferrule,
    positioning holes arranged on the blade ferrules,
    connection positioning blocks arranged at a junction of each upper blade ferrule and lower blade ferrule,
    an upper flange,
    a generator, and
    a lower flange, wherein:
    the rotation shaft is arranged on the base;
    the blade ferrules are installed on the rotation shaft;
    the turbine blades are installed on the blade ferrules;
    the rotation shaft is connected to the generator; and
    the upper flange is arranged above the generator and the lower flange is arranged under the generator.

2. The wind turbine according to claim 1, further comprising:
    turbine blade struts installed at a lateral side of the upper blade ferrule and at a lateral side of the lower blade ferrule.

3. The wind turbine according to claim 2, wherein:
    blade contact surfaces are arranged at a left end of the upper blade ferrule, a right end of the lower blade ferrule and outer ends of the turbine blade struts.

4. The wind turbine according to claim 2, wherein:
    each of the turbine blade struts is configured to have a protrusion; and
    a horizontal surface of the protrusion is perpendicular to a one of the plurality of turbine blades.

5. The wind turbine according to claim 4, wherein:
the blade contact surfaces have an arc shape.

6. The wind turbine according to claim 2, wherein:
a cross section of the turbine blade struts has an airfoil shape.

7. The wind turbine according to claim 1, wherein:
a total number of the blade ferrules is at least four;
the blade ferrules are installed on the rotation shaft in a spiral manner at equally divided locations; and
vertical distances between any two neighboring blade ferrules are the same.

8. The wind turbine according to claim 1, wherein:
the upper blade ferrule and the lower blade ferrule are fixated at the junction by a bolt through the positioning holes;
the connection positioning blocks are used for positioning during a process of holding the upper blade ferrule and the lower blade ferrule together.

9. The wind turbine according to claim 1, wherein:
the turbine blades are made of basalt; and
the turbine blades are fixed on blade contact surfaces in a twisted and rotated manner.

10. The wind turbine according to claim 1, wherein:
a set of the connection positioning blocks have compatible protruding and recessing trapezoidal shapes.

\* \* \* \* \*